United States Patent
Eberhardt et al.

(10) Patent No.: US 11,980,210 B2
(45) Date of Patent: May 14, 2024

(54) METHODS FOR A PRESERVED, DEOXYGENATED, FLAVORED BEVERAGE AND COMPOSITIONS THEREOF

(71) Applicant: Hoplark, LLC, Boulder, CO (US)

(72) Inventors: Dean Eberhardt, Boulder, CO (US); Andrew Markley, Boulder, CO (US)

(73) Assignee: Hoplark, LLC, Boulder, CO (US)

( * ) Notice: Subject to any disclaimer, the term of this patent is extended or adjusted under 35 U.S.C. 154(b) by 0 days.

(21) Appl. No.: 17/656,859

(22) Filed: Mar. 28, 2022

(65) Prior Publication Data
US 2022/0218004 A1 Jul. 14, 2022

Related U.S. Application Data (63) Continuation of application No. 17/643,992, filed on Dec. 13, 2021, now Pat. No. 11,819,043, which is a continuation of application No. 16/226,977, filed on Dec. 20, 2018, now Pat. No. 11,197,488.

(60) Provisional application No. 62/612,105, filed on Dec. 29, 2017.

(51) Int. Cl.
| | | |
|---|---|---|
| A23L 2/76 | (2006.01) | |
| A23F 3/40 | (2006.01) | |
| A23L 2/42 | (2006.01) | |
| A23L 2/54 | (2006.01) | |
| A23L 2/56 | (2006.01) | |

(52) U.S. Cl.
CPC ............... *A23L 2/76* (2013.01); *A23F 3/405* (2013.01); *A23L 2/42* (2013.01); *A23L 2/54* (2013.01); *A23L 2/56* (2013.01)

(58) Field of Classification Search
CPC ..... A23L 2/42; A23L 2/54; A23L 2/56; A23L 2/76; A23F 3/405
See application file for complete search history.

(56) References Cited

U.S. PATENT DOCUMENTS

| | | | | |
|---|---|---|---|---|
| 3,655,398 A | * | 4/1972 | Pitchon | A23F 5/262 |
| | | | | 426/434 |
| 9,303,241 B2 | | 4/2016 | Reeves | |
| 9,848,627 B2 | * | 12/2017 | Ito | C12G 3/06 |

(Continued)

FOREIGN PATENT DOCUMENTS

| | | | |
|---|---|---|---|
| CA | 961344 | * | 1/1975 |
| CN | 1243871 A | | 2/2000 |

(Continued)

OTHER PUBLICATIONS

Hops Go Beyond Beer . . . Strenk. 2015. https://www.specialtyfood.com/news/article/hops-go-beyond-beer-trending-beverage-infusion/.*
Office Action dated Dec. 28, 2022 issued in related Chinese patent app. No. 201880084705.2 (19 pages with English translation).
Office Action dated Jun. 17, 2023 issued in related Chinese patent app. No. 201880084705.2 (13 pages with English translation).

(Continued)

*Primary Examiner* — Anthony J Weier
(74) *Attorney, Agent, or Firm* — Haynes and Boone, LLP (57) ABSTRACT

A beverage product including a mixture having a dissolved oxygen content of less than 500 parts per billion, the mixture including hops flavor, and water and no sweeteners and no calories. The beverage product has the hoppy flavor is infused from hops in the water 2-3 hours. The oxygen content is less than 100 parts per billion. The mixture is carbonated. An anaerobic environment in the mixture does not include alcohol. The beverage does not include yeast. A ratio of floral flavors to earthy flavors is increased as compared to longer infusion times.

4 Claims, 7 Drawing Sheets

(56) References Cited

U.S. PATENT DOCUMENTS

| | | | | |
|---|---|---|---|---|
| 10,729,273 | B1* | 8/2020 | Goerke | A47J 31/4485 |
| 11,197,488 | B2 | 12/2021 | Markley et al. | |
| 2014/0127373 | A1 | 5/2014 | Han et al. | |
| 2017/0332824 | A1* | 11/2017 | Ballezzi | A47J 31/002 |
| 2018/0007926 | A1* | 1/2018 | Arroyo | A23F 5/26 |
| 2018/0177326 | A1* | 6/2018 | Tooker | A47J 31/10 |
| 2018/0344074 | A1* | 12/2018 | Dussault | F25D 31/002 |
| 2018/0368612 | A1* | 12/2018 | Stein | A47J 31/52 |
| 2019/0200798 | A1* | 7/2019 | Fleischmann | A47J 31/002 |
| 2019/0320840 | A1* | 10/2019 | Vastardis | A47J 31/44 |
| 2020/0063079 | A1 | 2/2020 | Bystrom-Williams et al. | |
| 2020/0146316 | A1* | 5/2020 | MacPherson | A23F 5/243 |
| 2022/0095651 | A1 | 3/2022 | Markley et al. | |
| 2022/0218004 | A1 | 7/2022 | Eberhardt et al. | |
| 2022/0218005 | A1 | 7/2022 | Eberhardt et al. | |

FOREIGN PATENT DOCUMENTS

| | | |
|---|---|---|
| CN | 1244349 A | 2/2000 |
| CN | 101348755 A | 1/2009 |
| CN | 103582431 A | 2/2014 |
| CN | 104762153 A | 7/2015 |
| EP | 3731646 A4 | 1/2022 |
| JP | 2005/295989 A1 | 10/2005 |
| JP | 2009-106164 A | 5/2009 |
| JP | 5391751 B2 | 1/2014 |
| WO | WO2019133416 | 7/2019 |

OTHER PUBLICATIONS

Office Action dated Aug. 1, 2023 issued in related Japanese patent app. No. 2020-555723(6 pages with English translation).

Office Action dated Oct. 27, 2022 issued in related Japanese patent app. No. 2020-555723 (8 pages).

International Search Report and Written Opinion dated Mar. 1, 2019 issued in corresponding PCT App. No. PCT/US2018/066693 (10 pages).

European Search Report dated Dec. 21, 2021 issued in related European Patent App. No. 18896330.0 (9 pages).

Nielsen, H. (1973) "The Control of Oxygen in Beer Processing," J. Inst. Brew., vol. 79, 147-154; retrieved from the internet: https://www.brewer-world.com/control-of-dissolved-oxygen/.

Barnette B.M. et al., (May 20, 2019) "Evaluating the Impact of Dissolved Oxygen and Aging on Dry-Hopped Aroma Stability in Beer," Journal of the American Society of Brewing Chemists, The Science of Beer, vol. 77, 2019—Issue 3; retrieved from the internet: https://www.tandfonline.com/doi/abs/10.1080/03610470.2019.1603002?journalCode=ujbc20.

"Control of Dissolved Oxygen (DO) during Beer Processing," Brewer World; Apr. 27, 2019; retrieved from the internet: http://thmodernbrewhouse.com/wp-content/uploads/2016/11/The-Control-of-Oxygen-in-Beer-Processing.pdf.

Office Action dated Aug. 17, 2023 issued in related Canadian patent app. No. 3087162 (3 pages).

* cited by examiner

METHODS FOR A PRESERVED, DEOXYGENATED, FLAVORED BEVERAGE AND COMPOSITIONS THEREOF

CROSS-REFERENCE TO RELATED APPLICATIONS

This application is a continuation-in-part of U.S. application Ser. No. 17/643,992 filed Dec. 13, 2021 now U.S. Pat. No. 11,819,043, which is a continuation of U.S. application Ser. No. 16/226,977 filed Dec. 20, 2018 now U.S. Pat. No. 11,197,488, which also claims the benefit of U.S. Provisional Application No. 62/612,105 filed Dec. 29, 2017.

BACKGROUND

Beverages having rich flavors and low calories are very desirable for consumers. Additionally, consumers typically disfavor artificial sweeteners or other non-natural ingredients. Therefore, it is desirable to provide a flavorful beverage with low calories.

BRIEF SUMMARY

In one embodiment, a method of producing a beverage, includes forming a mixture of liquid and organic material in a vessel, aging the liquid and organic material in the vessel, mixing the mixture in the vessel by recirculating the liquid, and removing the liquid from the vessel with flavor from the organic material infused therein. In one alternative, the method further includes mixing the liquid with an impeller. In another alternative, the method further includes changing the direction of recirculating the liquid. Alternatively, the method further includes alternating the direction of the recirculating liquid. Alternatively, the mixing has a time period of 1-5 hours. In another alternative, mixing has a time period of 2-3 hours. Alternatively, the liquid has a dissolved oxygen content of less than 0.5%. Alternatively, the method further includes purging the mixture with an inert gas to maintain an anoxic environment of the mixture or reduce the anoxic environment of the mixture and sealing the purged mixture in a container to produce an anaerobic, nonalcoholic beverage. Alternatively, the forming includes disrupting an equilibrium of dissolved oxygen in the water to produce water with a reduced dissolved oxygen content and sparging the composition with an inert gas to reduce the dissolved oxygen and thereby produce the water having the dissolved oxygen content of less than 0.5%. In another alternative, the liquid is water and the organic material is hops. Alternatively, floral flavors are maintained and earthy flavors are reduced in the liquid with the flavor from the organic material infused therein.

In another embodiment, a beverage product includes a mixture having a dissolved oxygen content of less than 500 parts per billion, effective for maintaining hoppy flavor, the mixture including hops flavor, and water and no sweeteners and no calories, and a container holding the mixture, the container being sealed to prevent the introduction of dissolved oxygen, a headspace of the container including inert gas, wherein the hoppy flavor is infused into the water 1-5 hours. Alternatively, the hoppy flavor is infused into the water 2-3 hours. In one alternative, the oxygen content is less than 100 parts per billion. Alternatively, the mixture is carbonated. In another alternative, an anaerobic environment in the mixture does not include alcohol. Alternatively, the beverage does not include yeast. In another alternative, floral flavors are maintained and earthy flavors are reduced in the mixture. Alternatively, floral flavors are maintained and earthy flavors are reduced in the mixture as compared to longer infusion times. Alternatively, a ratio of floral flavors to earthy flavors is increased as compared to longer infusion times. Alternatively, the hoppy flavor results from hops.

In another embodiment, beverage includes a mixture having a dissolved oxygen content of less than 500 parts per billion, the mixture including hops flavor, and water and no sweeteners and no calories, wherein the hoppy flavor is infused into from hops in the water 2-3 hours, the oxygen content is less than 100 parts per billion, the mixture is carbonated, where an anaerobic environment in the mixture does not include alcohol, the beverage does not include yeast, wherein a ratio of floral flavors to earthy flavors is increased as compared to longer infusion times.

In one embodiment, a beverage product includes a mixture having a dissolved oxygen content of less than 500 parts per billion, the mixture including tea flavor, hops flavor, and water. The beverage product further includes a container holding the mixture, the container being sealed to prevent the introduction of dissolved oxygen, a headspace of the container including inert gas. In one alternative, the oxygen content is less than 100 parts per billion. In another alternative, the mixture is carbonated. Alternatively, the mixture does not include alcohol. In another alternative, the beverage does not include yeast.

In one embodiment, a beverage includes a mixture having a dissolved oxygen content of less than 500 parts per billion, the mixture including tea flavor, hops flavor, and water. In one alternative, the oxygen content is less than 100 parts per billion. In another alternative, the mixture is carbonated. Alternatively, the mixture does not include alcohol. In another alternative, the beverage does not include yeast.

In one embodiment, a beverage consisting essential of a mixture having a dissolved oxygen content of less than 500 parts per billion, the mixture including tea flavor, hops flavor, and water. In one alternative, the oxygen content is less than 100 parts per billion. In another alternative, the mixture is carbonated. Alternatively, the mixture does not include alcohol. In another alternative, the beverage does not include yeast.

In one embodiment, a method of producing a beverage includes forming a mixture of tea flavor, hops flavor, and water having a dissolved oxygen content of less than 0.5%. The method further includes purging the mixture with an inert gas to maintain an anoxic environment of the mixture or reduce the anoxic environment of the mixture. The method further includes sealing the purged mixture in a container to produce an anaerobic, nonalcoholic beverage.

In one alternative, the steps in the process do not include a step of removing alcohol from either the mixture or the purged mixture and the mixture does not contain alcohol. In another alternative, the steps in the process do not include a step of adding fungus to the mixture and do not include a step of adding bacteria to the mixture. Alternatively, the forming includes disrupting an equilibrium of dissolved oxygen in the water to produce water with a reduced dissolved oxygen content. The forming further includes steeping tea in the water with the reduced dissolved oxygen content. The forming further includes removing the tea from the water with the reduced dissolved oxygen content to produce a composition of the water with the reduced dissolved oxygen content and the tea flavor that remains after the removing of the tea. The forming further includes sparging the composition with an inert gas to reduce the dissolved oxygen and thereby produce the water having the dissolved oxygen content of less than 0.5% combined with the tea flavor. Optionally, the forming includes anaerobically introducing hops to the composition and removing the hops from the composition to produce the hops flavor that remains after the removing of the hops. In one alternative, the purging is carried out in a vessel and, between the steps of the purging and the sealing, maintaining the increased anoxic environment while communicating the mixture to the container. In another alternative, the disrupting does not include vacuuming the mixture or in-line vacuum degassing the mixture. In one embodiment, a process is produced according to any of the methods above.

In one embodiment, an apparatus for storing hops includes a lid fitting onto a bucket, the lid comprising an air inlet, an air outlet, and a valve. In one alternative, the valve is a pressure release valve. In another alternative, the apparatus includes a dip tube. In another embodiment, the apparatus includes a barb or a thread or a quick disconnect, to accept an air hose.

DETAILED DESCRIPTION

Certain terminology is used herein for convenience only and is not to be taken as a limitation on the embodiments of the system and methods for a preserved, deoxygenated, flavored beverage and compositions thereof. In many embodiments, one of the flavors for the beverage is hops.

For beverages including flavors such as hops, the hop flavor may degrade significantly over time. This is especially true of the aroma that hops may bring to a beverage. Therefore, it is desirable to produce beverages that have a stable hop flavor and no sugars or sweeteners. In this way the brewed beverages may be sold bottled or canned without significant degradation of the hop flavor. Since typically, hops are used in beer that is deoxygenated by the fermentation process, such oxygen degradation is less of an issue with beer (although still exists). Additionally, residual sugar and alcohol still exist, so the beverage will have significant calories. Typically, the production of a flavorful beverage, that has good shelf life, is not possible without, sugar, fermentation, and yeast. Even if alcohol in a beverage is reduced, it will still typically contain some residual alcohol. Even if an attempt is made to remove yeast, some will typically remain. Therefore, processes including fermentation, will not yield the same types of beverages that are described in the deoxygenating and hopping process below.

In one embodiment, hop flavor is added to tea. Tea may include black tea, white tea, green tea, herbal tea, and various other teas. One embodiment of a method preparing a tea with hop flavor includes the following steps. Water is heated to about 185 F and tea is steeped in the water for about 3 minutes before the tea leaves are removed from the water. The resultant flavored water is then transferred into a container, such as a fermenter, brite tank, unitank or similar sealable apparatus. As part of this transfer, in many alternatives, the tea flavored water is strained, sealed, and cooled to about 36 F. Alternatively, or in addition, one or more flavoring agents is added to the flavored water, e.g., sugar, honey fruit juice, etc. Such agents are not added in many embodiments, especially those producing no or low calorie beverages. The container, again for example, a fermenter, brite tank, unitank or similar sealable apparatus, can be used for a hopping process. An inert gas, such as carbon dioxide, nitrogen, argon, etc., is sparged for about 30 minutes through an air diffusion device, such as a 2 micron air diffusion stone, at about 5 psi to deoxygenate the tea before hops are added. In many embodiments, it is desirable to achieve a benchmark can be <100 parts per billion dissolved Oxygen (DO) content in the tea. Generally, lower levels of dissolved Oxygen provide for better preserved hop flavor.

Hops are deoxygenated prior to addition to the flavored, deoxygenated water. For example, the hops can be placed in a vacuum in a container, apparatus, or vessel and/or purged with an inert gas, etc. prior to addition so as to deoxygenate the hops. The deoxygenated hops are then introduced anaerobically (such that they do not include oxygen) to the flavored, deoxygenated water. For example, a "hop gun", hopinator or other such device can be used to introduce the hops anaerobically. In many embodiments, the hops may not be deoxygenated. In some scenarios, the results may be similar in terms of flavor preservation, whether or not deoxygenated hops are used. In some scenarios, the hops may not be deoxygenated and the sparging may be completed after the application of hops. After the deoxygenated hops have been added, the headspace of the container, apparatus, or vessel is purged with an inert gas after the container, apparatus, or vessel is sealed, so as to maintain an anoxic environment for the resultant mixture. In many embodiments, adding hops can be considered dry hopping with the additional aspect of an anaerobic environment.

In many alternatives, the hops are removed from the mixture by allowing them to settle and transferring to another deoxygenated, sealed container. A filter can, if so desired, be used to separate the hops from the beverage. After the hops are removed from the mixture, the resultant liquid or beverage is purged with an inert gas. In many embodiments, if desired, the beverage is then carbonated. The inert gas could be constantly bubbled through the hop-steeping vessel to further reduce O2 infiltration. An inert gas may be used at this stage as well.

Embodiments herein can also be applied to reduce oxidation in unfermented, non-tea based beverages, such as fruit juices, sodas, sugar sweetened beverages, and beverages that comprise hops and water as their main ingredients. Hops typically are used in beverages that are fermented, such as beer. With such beverages, as a result of the fermentation process, the resulting beverage has a low oxygen content, since the oxygen has been consumed in the fermentation process. Therefore, ordinarily, if hops were added to tea without reduction of oxygen, the flavor would degrade more quickly. Generally, oxygen degrades the delicate aromatic compounds that processes like dry hopping add.

Another exemplary embodiment for a process for preparing a beverage, such as a non-alcoholic beverage, includes the following steps:

Reducing dissolved oxygen in water, e.g., by boiling water and then cooling the water, e.g., to about 185 degrees C.

Steeping tea leaves in the deoxygenated water, e.g., for about 3 minutes, then straining to remove the tea leaves, then sealing and cooling the resulting liquid, e.g., to about 4 degrees C.

Sparging the liquid with an inert gas, e.g., for about 30 minutes, so as to deoxygenate tea liquid, e.g., reducing the dissolved Oxygen, e.g., preferably to <500, more preferably <400, even more preferably <300, yet even more preferably <200, or even yet more preferably <100 parts per billion.

Vacuum sealing (or purging or both) the hops with an inert gas and adding the hops to the deoxygenated tea liquid anaerobically.

After sealing the tea liquid in a vessel etc., purging headspace of the vessel with an inert gas to maintain an anoxic environment.

After removing the hops, purging a container of the tea liquid with an inert gas, and then if desired;

and then carbonating the liquid or beverage, or adding a flavor anaerobically.

Beverage and other products employing the beverage, can be considered products produced by processes according to embodiments herein.

Figure 1:
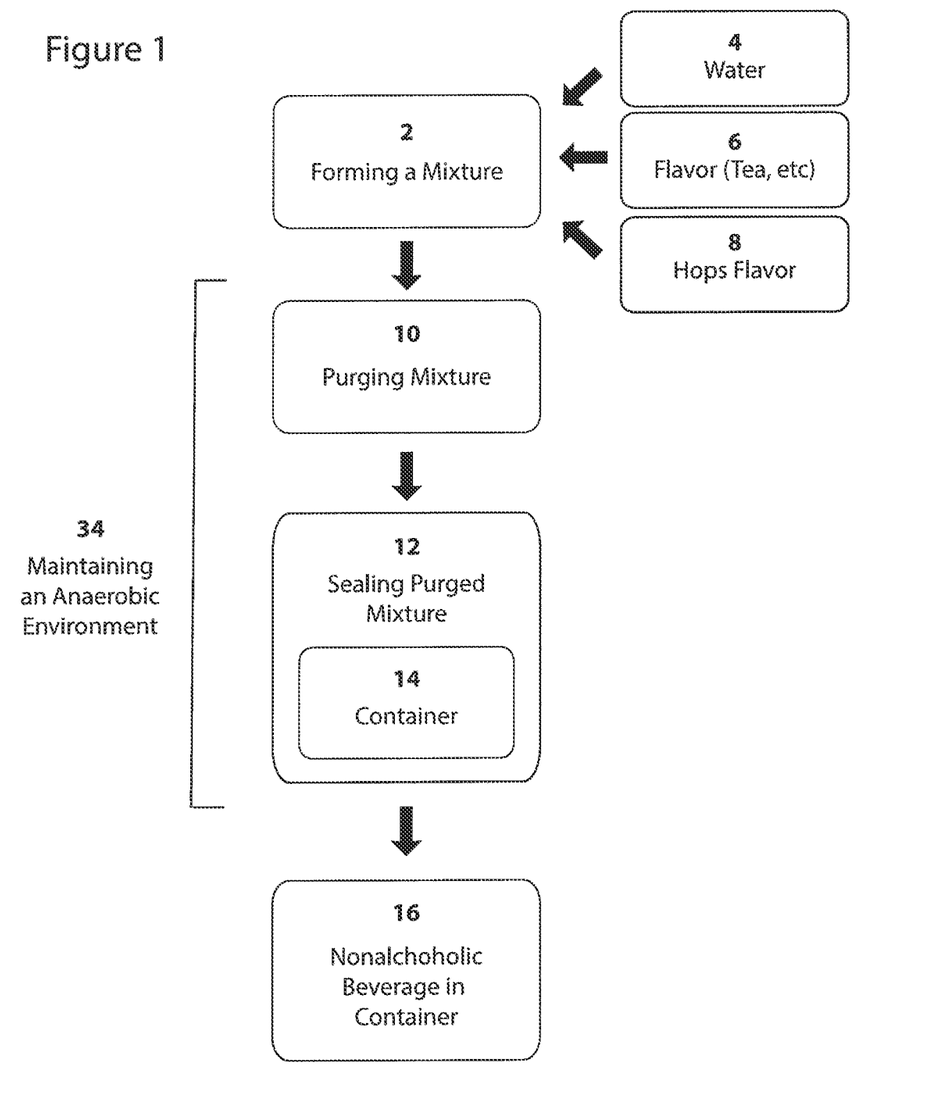
FIG. 1 shows one embodiment of a process flow chart for adding hop flavor to tea.

More particularly, with reference to the figures, note that FIG. 1 indicates that a mixture 2 is formed by combining water 4, tea flavor 6, and hops flavor 8 in a container that essentially excludes atmospheric oxygen 14. Other flavors in combination with tea or in the place of tea could also be used, including fruit juice, lemonade, limeade, coffee, plant-based waters, artificial flavorings, sugars, sodas, bone broth, horchata, agua fresca, ginger flavored beverages, flavored water and beverages that contain no flavoring other than hops. The container may be a fermenter, bright tank, unitank, or the like. The oxygen concentration of the resulting mixture may be reduced from these components by purging them with inert gas or an in-line vacuum degassing system 10. The inert gas may be carbon dioxide, nitrogen, argon, etc. The gassed mixture is isolated from ambient oxygen by sealing the gassed mixture 12 in a container 14 resulting in a non-oxidized hopped beverage 16.

Figure 2:
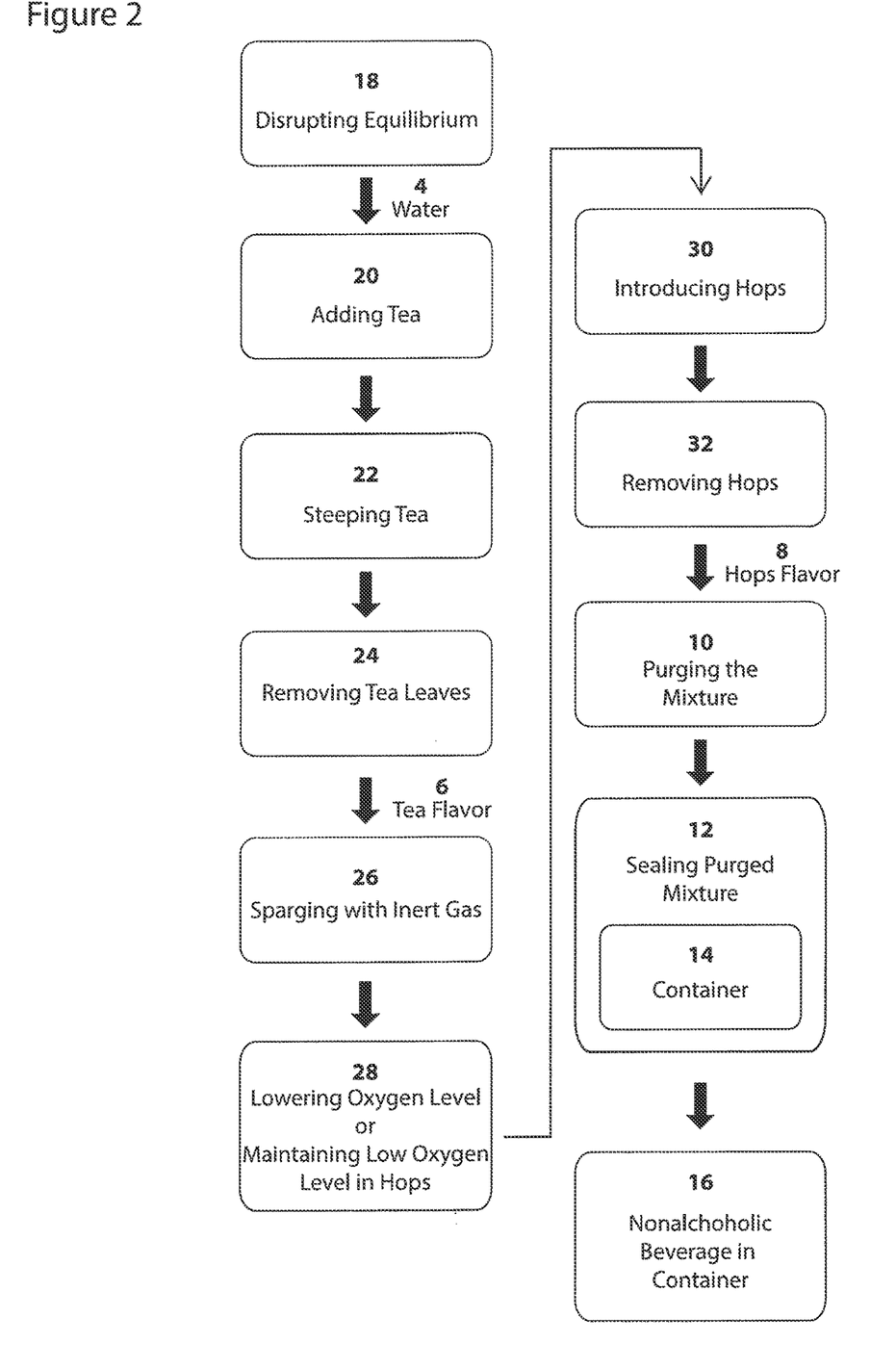
FIG. 2 shows another embodiment of a process flow chart for adding hop flavor to tea.
Figure 3:
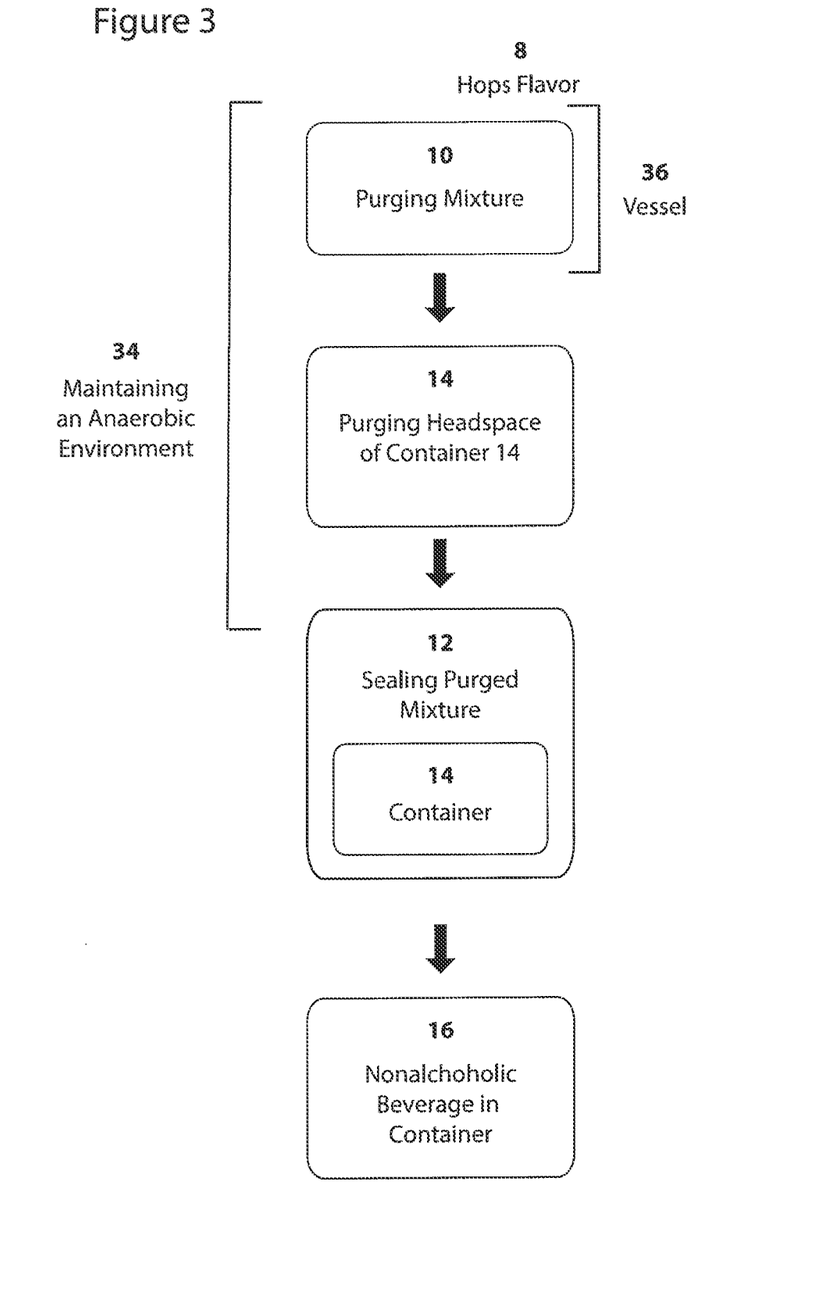
FIG. 3 shows another embodiment of a process flow chart for adding hop flavor to tea.

Referring to FIG. 2, in one embodiment of a method of preparing a beverage, water 4 is heated in step 18, which disrupts the oxygen equilibrium in the water. Tea leaves are added in step 20 and steeped in the water for some amount of time in step 22, depending on the concentration of flavor desired. In step 24, the tea leaves are removed. Any of concentrated tea flavoring extract, concentrate, powder 6 or the like may be added to the water 4 with the disrupted the oxygen equilibrium. The oxygen concentration of the mixture may lowered to e.g., to <100, <200, <300, <400, <500 parts per billion as may be preferred in one embodiment or another by injecting a non-oxidative (inert) gas or gasses in step 26, and/or vacuum stripping in step 28.

In many embodiments, an airstone is used for delivery of the inert gas into the mixture, or the gas may be injected directly through ports, tubing, or perforated tubing, etc. A dissolved oxygen sensor may be used to assess the oxygen content of the mixture.

Hops flavor is then added in step 30. Examples of hops flavor that can be used, include, but are not limited to whole leaf hops, pellet hops, hops powder, hops oil, and/or hops extract. In many embodiments, a non-oxidative gas is added to the hops prior to introducing the hops flavor into the mixture, and/or the hops are added to a second, deoxygenated container after which the tea mixture is added. In many configurations, a pump is used to facilitate mixing and hops flavor extraction. In some embodiments, during this hop extraction process, non-oxidative gas is injected to the mixture. In other embodiments, the mixture is sent through an in-line degasser to maintain a low oxygen environment. Some portion of the insoluble hops material may then be removed, depending on the embodiment desired. In many embodiments, this is carried out by transferring the liquid to a second vessel, filtering the liquid, dumping the gravity settled hops, or decanting floating hops in step 32 while maintaining a low oxygen concentration by stripping or sparging oxygen or isolating the mixture from atmospheric oxygen infiltration in step 10. The resultant beverage is sealed in step 12 in a container 14 resulting in in step 16, a low oxygen hopped beverage that contains no appreciable alcohol content.

Figure 4:
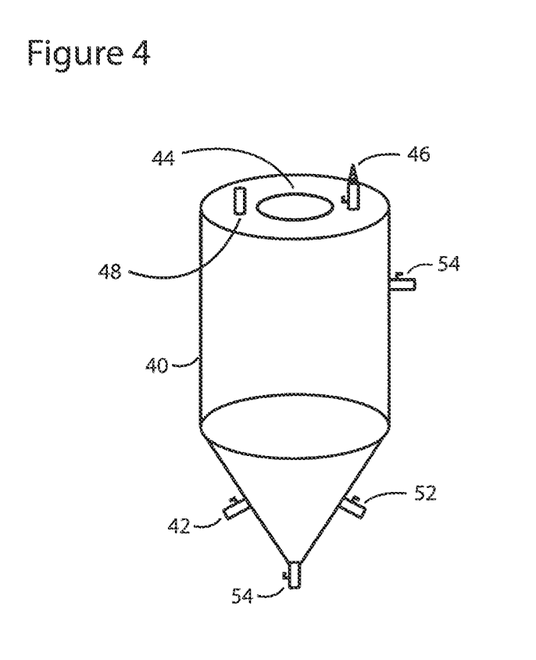
FIG. 4 shows a depiction of one embodiment of the apparatus used in the hopping process.

Referring to FIG. 4, one embodiment of a vessel 40 used for the sparging and hopping process is a container that essentially excludes oxygen. Commercially available containers such as a fermenter, brite tank, unitank or other similar containers can be used for vessel 40. The vessel 40 has a port 42 introduce the inert gas during the sparging process. Port 42 may be a valve, inlet, or other connection area for introducing the inert gas. Vessel 40 has an opening to introduce hops such as a port or valve 44. Vessel 40 has a way to vent gas such as a manually controllable valve 46 or pressure release valve 48. A container that can handle elevated pressures up to 1, 2, 5, 10, 15 psi or higher (depending on the preferred embodiment) is desirable for the sparging and subsequent transferring processes. Liquid port with valve 52 can be used to add the liquid before the hopping process or remove the liquid after the hopping process. The actual containers used may vary, however, in many embodiments, the container excludes oxygen and has various ports for the introduction and removal of liquids, gases, and mixtures.

Additional ports 54 at the bottom of the vessel 40 or towards or at the top of the vessel 40 can also be used for transferring or mixing of the mixture. Among the necessary intermediates are liquids having hops flavor (can be a mixture of flavor compounds) and reduced the dissolved Oxygen, e.g., preferably to <500, more preferably <400, even more preferably <300, yet even more preferably <200, or even yet more preferably <100 parts per billion.

Some, but not all embodiments, produce a product such as an alcohol free, hop flavored beverage that has hop flavor similar to those flavors found in fermented beverages. In some embodiments, alcohol such as of beer, wine, or distilled spirits are sparged with an inert gas and then added to the hopped beverage. In some embodiments, purified alcohol is added to the mixture before the sparging and hopping process to make an alcoholic hopped beverage without the use of biological processes within the oxygen reduction or hopping process.

Some, but not all embodiments, produce a product such as an additive of the hopped liquid as a flavoring agent to baked goods such as soda breads, quick breads, scones, cakes and pastries.

Some, but not all embodiments, produce a product such as an additive of the hopped liquid product as a flavoring agent to waffles.

One embodiment of an apparatus for facilitating storage of hops in a lower oxygen environment is now described. Presently, in commercial brewery or beverage making facilities, bulk hops are typically sold in 11 pound bags that have been purged of oxygen for long term storage. Once the bag is opened, oxygen can be introduced into the hops, causing them to oxidize and degrade over time. Bags can be purged of oxygen and resealed but that is a difficult process. There exists a need for a robust, ridged apparatus to purge the inert gas from the hops and store them that is both relatively inexpensive (and preferably stackable) so that the many varieties of hops can be stored for longer periods of time without degradation of flavor.

Figure 5:
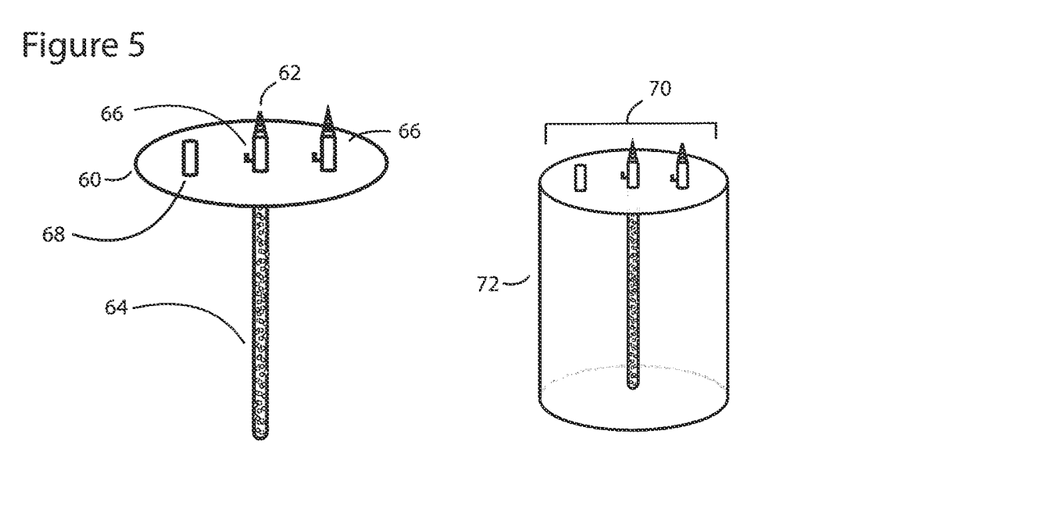
FIG. 5 shows a depiction of one embodiment of a hops storage device.

Referring to FIG. 5, a container for storing hops in a reduced oxygen environment is described. Some, but not all embodiments, of this container comprise a lid 60 that fits (e.g., separately sold) containers such as a 0.5, 1, 2, 5, 10, or 55-gallon bucket or a bin. In many embodiments, the lid 60 is composed of a ridged material, such as plastic or metal. The lid 60 has a sealable device for introducing pressurized gas 62, e.g., a barb for attaching an air hose. A connection for the pressurized gas to the lid 60 could also be a threaded junction. The connection for the pressurized gas to the lid 60 could also be a quick disconnection device. An air inlet can connect to a perforated post that extends down into the container 64. In many embodiments, the perforations or holes are small enough to exclude hop bines or pellets from entering the post, e.g., smaller than 6 mm in diameter. A controllable vent port 66 and/or pressure release valve 68 is attached to the lid to facilitate gas venting from the sealed container. In many embodiments, the exit port has a barb or threaded connection for attaching an oxygen content monitoring device. The lid device 70 attaches to separately produced receptacle 72 such as a bucket or bin in a way that creates an airseal to separate the internal from external environment.

Figure 6:
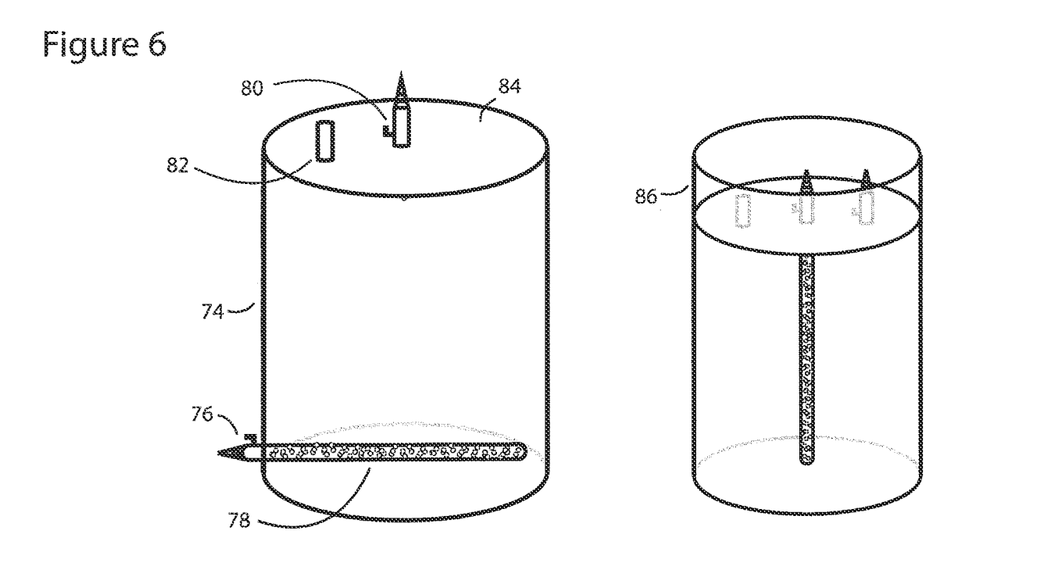
FIG. 6 shows a depiction of one embodiment of a hops storage device.

Referring to FIG. 6, another embodiment includes a whole container 74 such as a bucket or bin with a sealable port for introducing pressurized gas from the side 76 which in many instances is a barb for attaching an air hose. The connection for the pressurized gas to the lid could also be a threaded junction. The connection for the pressurized gas to the lid could also be a quick disconnection device. In many embodiments, the air inlet connects to a perforated post that extends sideways into the container 78. In many embodiments, the perforations or holes are small enough to exclude hop bines or pellets from entering the post, e.g., smaller than 6 mm in diameter. A controllable vent port 80 and/or pressure release valve 82 is attached to the lid 84 to facilitate gas venting from the sealed container. In many embodiments, the exit port has a barb or threaded connection for attaching an oxygen content monitoring device. Another embodiment of includes an elevated rim or bumper on the lid or top of the device 86. This rim or bumper may be made of rubber, plastic or metal to protect the ports and facilitate stacking of the hops containment device.

Figure 7:
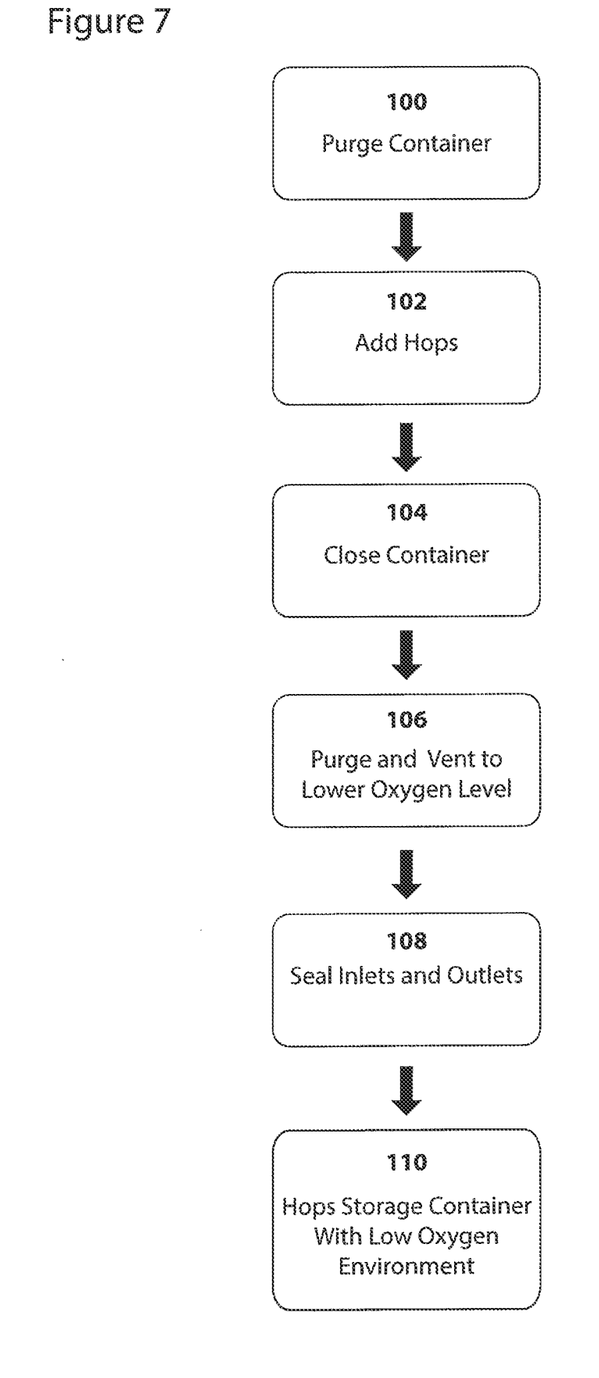
FIG. 7 shows another embodiment of a process flow chart for the hops storage device.

FIG. 7 shows a method of using embodiments of the hop storing containers. Referring to FIG. 7, in many embodiments, the above described apparatus is used by purging the container with inert gas in step 100. Hops are added to the container in step 102 and then the container is sealed in step 104 using a lid or other port device. An inert gas is then added and the gas inside the container is vented in step 106 to lower the oxygen level. Once the desired oxygen level is obtained the ports are sealed creating a hops storage container with a low oxygen environment in step 108. In step 110, the hops are safely stored in the container in a low oxygen environment.

Figure 8:
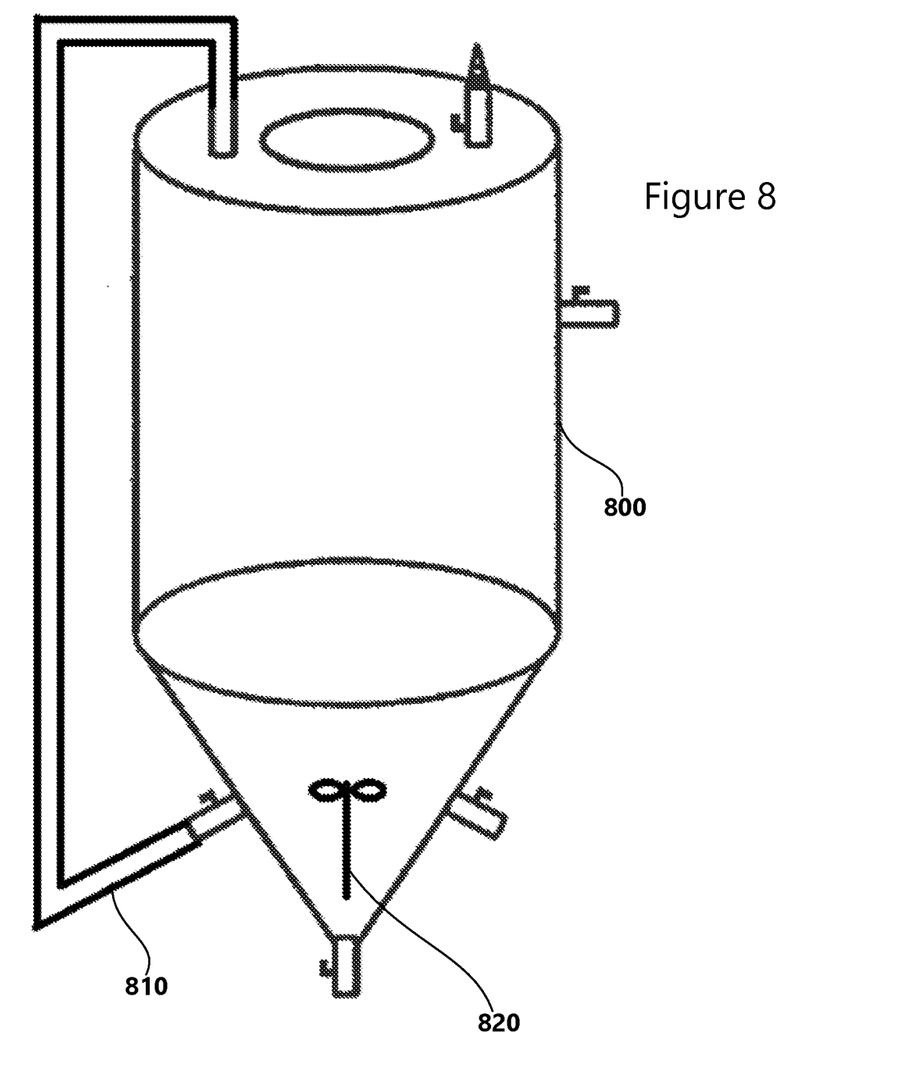
FIG. 8 shows another embodiment of an apparatus used in the hopping process.

Referring to FIG. 8, one embodiment of a vessel 800 used for the sparging and hopping process is a container that essentially excludes oxygen. Commercially available containers such as a fermenter, brite tank, unitank or other similar containers can be used for vessel 800. Similar to the embodiment of FIG. 4, vessel 800 may include various ports and vents for inserting inert gas, reducing pressure, adding liquid, transferring liquid to another container, etc. Various options are possible. Additionally, in many configurations, vessel 800 includes a recirculation tube 810. Recirculation tube 810 provides for the recirculation and mixing of the liquids in vessel 800, by pumping liquid from the top of the container and recirculating it to the bottom. This causes various eddies and vortexes in the vessel to occur. In many embodiments, when hops and water are used in vessel 800, this provides for greatly increased mixing on the basis of increasing surface area to volume. This method functions in many aspects. One aspect is that, in many configurations, the hops may float or be suspended near the top of the vessel. Therefore, by recirculating the liquid from the top of the container to the bottom, these floating or suspended hops are more readily mixed. In another aspect, the hops may sink to the bottom of the container. Similarly, recirculating the liquid from the top of the container to the bottom, the hops at the bottom may be pushed up further into the mixture. In one alternative, the method of recirculation may be reversed. Alternatively, the direction of recirculation may be alternated, sometimes being from the top to the bottom and other times being from the bottom to the top. Various recirculation timing may be used and additionally, the recirculation direction may vary during the flavoring process, as the hops (or other infusing material) may increase in density from the start of the process to the end of the process, therefore, causing them to float early in the process and sink towards the end of the process. In many embodiments, the point of such systems is to increase agitation. This may occur via mixing, recirculation, cavitation, or other techniques that will occur to one of skill in the art.

Additionally, the process of recirculating, may further break up the hops, causing an increase in the surface area to volume ratio of the hops and increasing the speed of infusion of flavors. As will be apparent to one of ordinary skill, the speed of diffusion in part relates to the surface area to volume ration of the hops. Additionally, in many aspects, the hops being infused in vessel 800 may form a diffusion barrier layer around the surface of the hops. This occurs when a sublayer of surface tension water forms around the hops, preventing diffusion away from the sublayer, similar to in a laminar sublayer/viscous sublayer type arrangement. Therefore, the water immediately adjacent to the hops may become saturated and inhibit some degree of diffusion. By inducing greater mixing, greater diffusion may occur. In some embodiments, vessel 800 may include an impeller 820. Impeller 820 may further increase the mixing of the container. Based on the increased speed of mixing, a greater level of aromatic flavors may be harvested from the hops in a reduced time period. For instance, instead of hopping the water for 2-14 days, hopping may occur over minutes to hours, with an optimal range thought to be 1-5 hours and more optionally 2-3 hours. This change of range has multiple effects, one of which is the preservation of hops flavor, especially delicate floral aromas, which are typically volatile (many times volatile organic carbons). These aromas may break down quickly, especially considering a 2-14 day flavoring, but may be preserved over a shorter processing period.

Additionally, although the typical scenario for hopping is described in relation to hops and water various liquids and materials may be used in place of water and hops. Typically, the process will involve, tea, beer, liquor or other beverage a liquid. Typically, hops is used, however, other materials having floral and organic components may be used, especially those containing floral type flavors and aromas. It is important in many configurations, that subsequent to the processing in vessel 800, the oxygen content of the mixture is retained at a low level as described in other locations herein. Based on the increased speed of mixing, a greater level of aromatic flavors may be harvested from the hops in a reduced time period. For instance, instead of hopping the water for 2-14 days, hopping may occur over minutes to hours, with an optimal range thought to be 1-5 hours and more optionally 2-3 hours. This change of range has multiple effects, one of which is the preservation of hops flavor, especially delicate floral aromas, which are typically volatile (many times volatile organic carbons). These aromas may break down quickly, especially considering a 2-14 day flavoring, but may be preserved over a shorter processing period. In many embodiments, due to the shortened residence time, the resulting liquid will have increased floral and fruity flavors as compared to rooty, nutty, and earthy flavors. The delicate floral aromas will be maintained, while the more earthy flavors will be less extracted.

Therefore, in many embodiments, a system for rapidly adding organic flavor to a liquid includes, a vessel that provides a recirculation system. The vessel may function in a low oxygen environment and may be splurged with gas, such as nitrogen or carbon dioxide or other non-reactive gas, in order to keep the oxygen level low. A variety of liquids may be used. In many embodiments, this is water or tea, however in alternatives, other liquids may be used, including but not limited to, beer, wine, liquor, other flavored drinks, etc. In many embodiments, the organic flavor may result from hops, however, other organic materials are possible, including but not limited to, as tea, hemp, cannabis, pine, wood, aloe, other plants, and any organic material including volatile organic carbons. In many embodiments, the organic material is added to the vessel in a pelletized or broken down form.

In many embodiments, a beverage including hops flavor having low oxygen content is created. In many alternatives, the beverage also includes tea flavoring. In many alternatives, no yeast is added to the beverage and no yeast remains in the beverage. In many embodiments, the dissolved Oxygen is very low, e.g., preferably to <500, more preferably <400, even more preferably <300, yet even more preferably <200, or even yet more preferably <100 parts per billion. In many embodiments, the beverage contains no sugar and therefore no fermentation is possible to reduce dissolved oxygen.

In sum, with respect to the description herein, numerous specific details are provided, such as examples of components and/or methods, to provide a thorough teaching and understanding of embodiments of the present invention. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Similarly, embodiments can be implemented in many forms, and based on the disclosure and teachings provided herein, a person of ordinary skill in the art will appreciate other ways and/or methods to implement an equivalent. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment.

Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as otherwise operable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary and the overview paragraphs, are not intended to be exhaustive or to limit the disclosed system, apparatuses, methods, compositions of matter or other disclosed subject matter to the precise forms disclosed herein. While specific embodiments of, and examples for, the disclosed system, apparatuses, methods, compositions of matter or other disclosed subject matter are described herein for teaching-by-illustration purposes only, various equivalent modifications are possible within the spirit and scope of the disclosed system, apparatuses, methods, compositions of matter or other disclosed subject matter, as those skilled in the relevant art will recognize and appreciate. As indicated, these modifications may be made in light of the foregoing description of illustrated embodiments and are to be included within the true spirit and scope of the disclosure herein provided.

What is claimed as new and desired to be protected by Letters Patent is:

1. A method of producing a beverage, the method comprising:

forming a mixture of liquid and organic material in a vessel;

aging the liquid and organic material in the vessel;

mixing the mixture in the vessel by recirculating the liquid wherein the mixing has a time period of 2-3 hours;

removing the liquid from the vessel with flavor from the organic material infused therein;

wherein the liquid is water and the organic material is hops and floral flavors are maintained and earthy flavors are reduced in the liquid with the flavor from the organic material infused therein.

2. The method of claim 1, further comprising mixing the liquid with an impeller.

3. The method of claim 1, further comprising changing the direction of recirculating the liquid.

4. The method of claim 1, further comprising alternating the direction of the recirculating liquid.

* * * * *